United States Patent [19]
Sharma et al.

[11] Patent Number: 6,085,263
[45] Date of Patent: Jul. 4, 2000

[54] METHOD AND APPARATUS FOR EMPLOYING COMMIT-SIGNALS AND PREFETCHING TO MAINTAIN INTER-REFERENCE ORDERING IN A HIGH-PERFORMANCE I/O PROCESSOR

[75] Inventors: Madhumitra Sharma, Shrewsbury; Chester Pawlowski, Westford, both of Mass.; Kourosh Gharachorloo, Stanford, Calif.; Stephen R. Van Doren, Northborough, Mass.; Simon C. Steely, Jr., Hudson, N.H.

[73] Assignee: Compaq Computer Corp., Houston, Tex.

[21] Appl. No.: 08/956,861

[22] Filed: Oct. 24, 1997

[51] Int. Cl.[7] .................................................. G06F 13/14
[52] U.S. Cl. ............................. 710/56; 710/59; 710/119; 711/167; 711/203; 711/239; 712/23; 712/218
[58] Field of Search ..................................... 711/167, 146, 711/147, 150, 137, 203, 239; 710/56, 59, 119; 712/23, 218

[56] References Cited

U.S. PATENT DOCUMENTS

| | | | |
|---|---|---|---|
| 4,298,929 | 11/1981 | Capozzi ............................. | 711/239 X |
| 5,182,808 | 1/1993 | Bagnoli et al. ........................ | 710/119 |
| 5,226,126 | 7/1993 | McFarland et al. ................... | 712/218 |
| 5,404,464 | 4/1995 | Bennett ................................. | 710/101 |
| 5,420,991 | 5/1995 | Konigsfeld et al. ................... | 711/150 |
| 5,463,753 | 10/1995 | Fry et al. .............................. | 711/146 |
| 5,504,900 | 4/1996 | Raz ........................................ | 707/10 |
| 5,546,554 | 8/1996 | Yung et al. ............................ | 711/203 |
| 5,546,582 | 8/1996 | Brockmeyer et al. ................. | 709/300 |
| 5,551,005 | 8/1996 | Sarangdhar et al. .................. | 711/145 |
| 5,761,731 | 6/1998 | Doren et al. .......................... | 711/155 |
| 5,802,569 | 9/1998 | Genduso et al. ...................... | 711/137 |
| 5,875,326 | 2/1999 | Cheong et al. ........................ | 395/591 |
| 5,900,020 | 5/1999 | Safranek et al. ...................... | 711/167 |
| 5,961,629 | 10/1999 | Nguyen et al. ........................ | 712/23 |

OTHER PUBLICATIONS

Shared Memory Consistency Models: A Tutorial, Sarita V. Adve, et al., Western Research Laboratory, 1995, pp. 1–28.

*Primary Examiner*—Thomas C. Lee
*Assistant Examiner*—Tammara Peyton

[57] ABSTRACT

An improved I/O processor (IOP) delivers high I/O performance while maintaining inter-reference ordering among memory reference operations issued by an I/O device as specified by a consistency model in a shared memory multiprocessor system. The IOP comprises a retire controller which imposes inter-reference ordering among the operations based on receipt of a commit signal for each operation, wherein the commit signal for a memory reference operation indicates the apparent completion of the operation rather than actual completion of the operation. In addition, the IOP comprises a prefetch controller coupled to an I/O cache for prefetching data into cache without any ordering constraints (or out-of-order). The ordered retirement functions of the IOP are separated from its prefetching operations, which enables the latter operations to be performed in an arbitrary manner so as to improve the overall performance of the system.

18 Claims, 10 Drawing Sheets

METHOD AND APPARATUS FOR EMPLOYING COMMIT-SIGNALS AND PREFETCHING TO MAINTAIN INTER-REFERENCE ORDERING IN A HIGH-PERFORMANCE I/O PROCESSOR

CROSS-REFERENCE TO RELATED APPLICATION

This invention is related to the U.S. patent application Ser. No. 08/957,097 titled, Method and Apparatus for Reducing Latency of Inter-Reference Ordering in a Multiprocessor System by Sharma et al., now abandoned which was filed on even date herewith and assigned to the assignee of the present invention, and which application is hereby incorporated by reference as though fully set forth herein.

FIELD OF THE INVENTION

The invention relates to multiprocessor systems and, more particularly, to the efficient ordering of memory reference operations issued by an input/output processor of a multiprocessor system.

BACKGROUND OF THE INVENTION

Multiprocessing systems, such as symmetric multiprocessors, provide a computer environment wherein software applications may operate on a plurality of processors using a single address space or shared memory abstraction. In a shared memory system, each processor can access any data item without a programmer having to worry about where the data is or how to obtain its value; this frees the programmer to focus on program development, e.g., algorithms, rather than managing partitioned data sets and communicating values. Interprocessor synchronization is typically accomplished in a shared memory system between processors performing read and write operations to "synchronization variables" either before and after accesses to "data variables".

For instance, consider the case of a processor P1 updating a data structure and processor P2 reading the updated structure after synchronization. Typically, this is accomplished by P1 updating data values and subsequently setting a semaphore or flag variable to indicate to P2 that the data values have been updated. P2 checks the value of the flag variable and, if set, subsequently issues read operations (requests) to retrieve the new data values. Note the significance of the term "subsequently" used above; if P1 sets the flag before it completes the data updates or if P2 retrieves the data before it checks the value of the flag, synchronization is not achieved. The key is that each processor must individually impose an order on its memory references for such synchronization techniques to work. The order described above is referred to as a processor's inter-reference order. Commonly used synchronization techniques require that each processor be capable of imposing an inter-reference order on its issued memory reference operations.

| P1 | P2 |
|---|---|
| Store Data, New-value | L1: Load Flag |
| Store Flag, 0 | BNZ L1 |
|  | Load Data |

The inter-reference order imposed by a processor is defined by its memory reference ordering model or, more commonly, its consistency model. The consistency model for a processor architecture specifies, in part, a means by which the inter-reference order is specified. Typically, the means is realized by inserting a special memory reference ordering instruction, such as a Memory Barrier (MB) or "fence", between sets of memory reference instructions. Alternatively, the means may be implicit in other opcodes, such as in "test-and-set". In addition, the model specifies the precise semantics (meaning) of the means. Two commonly used consistency models include sequential consistency and weak-ordering, although those skilled in the art will recognize that there are other models that may be employed, such as release consistency.

Sequential Consistency

In a sequentially consistent system, the order in which memory reference operations appear in an execution path of the program (herein referred to as the "I-stream order") is the inter-reference order. Additional instructions are not required to denote the order simply because each load or store instruction is considered ordered before its succeeding operation in the I-stream order.

Consider the program example below. The program performs as expected on a sequentially consistent system because the system imposes the necessary inter-reference order. That is, P1's first store instruction is ordered before P1's store-to-flag instruction. Similarly, P2's load flag instruction is ordered before P2's load data instruction. Thus, if the system imposes the correct inter-reference ordering and P2 retrieves the value 0 for the flag, P2 will also retrieve the new value for data.

Weak Ordering

In a weakly-ordered system, an order is imposed between selected sets of memory reference operations, while other operations are considered unordered. One or more MB instructions are used to indicate the required order. In the case of an MB instruction defined by the Alpha® 21264 processor instruction set, the MB denotes that all memory reference instructions above the MB (i.e., pre-MB instructions) are ordered before all reference instructions after the MB (i.e., post-MB instructions). However, no order is required between reference instructions that are not separated by an MB.

| P1: | | P2: | |
|---|---|---|---|
| Store | Data1, New-value1 | L1: Load | Flag |
| Store | Data2, New-value2 | | |
| MB | | BNZ | L1 |
| Store | Flag, 0 | MB | |
| | | Load | Data1 |
| | | Load | Data2 |

In above example, the MB instruction implies that each of P1's two pre-MB store instructions are ordered before P1's store-to-flag instruction. However, there is no logical order required between the two pre-MB store instructions. Similarly, P2's two post-MB load instructions are ordered after the Load flag; however, there is no order required between the two post-MB loads. It can thus be appreciated that weak ordering reduces the constraints on logical ordering of memory references, thereby allowing a processor to gain higher performance by potentially executing the unordered sets concurrently.

The prior art includes other types of barriers as described in literature and as implemented on commercial processors.

For example, a write-MB (WMB) instruction on an Alpha microprocessor requires only that pre-WMB store instructions be logically ordered before any post-WMB stores. In other words, the WMB instruction places no constraints at all on load instructions occurring before or after the WMB.

To increase performance, modem processors do not execute memory reference instructions one at a time. It is desirable that a processor keep a large number of memory references outstanding and issue, as well as complete, memory reference operations out-of-order. This is accomplished by viewing the consistency model as a "logical order", i.e., the order in which memory reference operations appear to happen, rather than the order in which those references are issued or completed. More precisely, a consistency model defines only a logical order on memory references; it allows for a variety of optimizations in implementation. It is thus desired to increase performance by reducing latency and allowing (on average) a large number of outstanding references, while preserving the logical order implied by the consistency model.

In prior systems, a memory barrier instruction is typically passed upon "completion" of an operation. For example, when a source processor issues a read operation, the operation is considered complete when data is received at the source processor. When executing a store instruction, the source processor issues a memory reference operation to acquire exclusive ownership of the data; in response to the issued operation, system control logic generates "probes" to invalidate old copies of the data at other processors and to request forwarding of the data from the owner processor to the source processor. Here the operation completes only when all probes reach their destination processors and the data is received at the source processor. Prior systems thus rely on completion to impose inter-reference ordering. That is in a weakly-ordered system employing MB instructions, all pre-MB operations must be complete before the MB is passed and post-MB operations may be considered.

An I/O device of a multiprocessing system may interact with the processors by issuing memory reference operations to control logic of the system through an I/O processor (IOP). The IOP may issue device requests and buffer results in various ways which directly impact the I/O performance of the system. Specifically, bandwidth is limited by the rate at which an IOP may issue requests and/or the number of requests it may keep outstanding at a time.

Since I/O devices interact with processors of the multiprocessor system, a consistency model must be specified for these interactions. 1/O devices typically expect sequentially consistent behavior with respect to the issued memory reference operations. That is, an I/O device expects each read and write operation issued by it to appear as if it is executed by the IOP and multiprocessor system in the order issued by the device. The IOP, in turn, must issue and complete these memory reference operations in such a way that the logical order is preserved.

A typical approach to ensuring sequential consistency is for the IOP to "complete" each previous operation from an I/O device before issuing a subsequent operation from that device. Essentially, "completion of an operation" requires actual completion of all activity, including receipt of data and acknowledgments, corresponding to the operation. Such an arrangement is inefficient and, in the context of inter-reference ordering, adversely affects latency. Therefore, the present invention is directed to increasing the efficiency of a multiprocessor system having a shared memory by relaxing the completion of an operation requirement while ensuring shared memory data consistency among the processors and IOP.

SUMMARY OF THE INVENTION

The invention relates to an improved I/O processor (IOP) for delivering high I/O performance while maintaining inter-reference ordering among memory reference operations issued by an I/O device as specified by a consistency model in a shared memory multiprocessor system. The novel IOP comprises a retire controller which imposes inter-reference ordering among the operations based on receipt of a commit signal for each operation, wherein the commit signal for a memory reference operation indicates the apparent completion of the operation rather than actual completion of the operation. In addition, the IOP comprises a prefetch controller coupled to an I/O cache for prefetching data into cache without any ordering constraints (or out-of-order). Significantly, the ordered retirement functions of the IOP are separated from its prefetching operations, which enables the latter operations to be performed in an arbitrary manner so as to improve the overall performance of the system.

As described herein, the multiprocessing system may comprise (i) a symmetric multiprocessing (SMP) node wherein the processor, IOP and shared memory entities are interconnected by a local switch or (ii) a SMP system wherein a plurality of nodes are interconnected by a hierarchical switch. Each processor and IOP preferably has a private cache for storing data and changes to the data as a result of the memory reference operations are reflected among the entities via the transmission of probe commands in accordance with a conventional cache coherence protocol. Notably, associated with the system is an ordering point. In the SMP node, the ordering point is associated with the local switch whereas in the SMP system, the ordering point is associated with the hierarchical switch.

As an example of a SMP node with an ownership-based, write-invalidate cache coherence protocol, a requesting processor or IOP issues a memory reference operation to the system requesting particular data. Upon determining which entity is the owner of the data and which entities have valid copies of the data, the ordering point totally orders the memory reference operation with respect to the other issued references using, e.g., a conventional arbitration or prioritization policy. Thereafter, the ordering point generates probes to invalidate any copies of the data at appropriate processors or IOP and/or to request forwarding of the data from the owner processor or IOP to the requesting processor or IOP, as required by the memory operation. Significantly, the ordering point also generates the commit-signal at this time for transmission to the requesting processor or IOP. Probes and commit signals are generated atomically for transmission to the appropriate processors or IOP. The net result is that all memory operations appear totally ordered.

Ordering of the requested memory reference operation with respect to memory references issued by other processors of the system constitutes a commit-event for the requested operation. For the SMP node embodiment, the commit-event is the point at which the memory reference operation is ordered at the local switch, whereas for the SMP system the commit-event occurs when the memory reference operation is ordered at the hierarchical switch. The commit-signal is preferably transmitted to the requesting processor upon the occurrence of, or after, such a commit-event.

As described above, the IOP appears to the system much like a processor. The internal organization of the IOP is configured to handle I/O traffic between I/O devices and the system. To that end, the prefetch controller selectively forwards device requests to the system, depending upon the state of the IOP cache, in an entirely unconstrained order.

Out-of-order prefetching in this manner allows the IOP to keep a large number of requests outstanding to the multi-processor system logic. The retire controller, on the other hand, delays retirement of an operation until appropriate commit-signals have been received. The set of commit-signals required before retirement is dependent on the consistency model.

In the illustrative embodiment, the I/O device implements a sequentially consistent ordering model. Sequential consistency is typically ensured by requiring the IOP to actually complete a previous operation before issuing a subsequent operation. According to the present invention, however, issuance of the subsequent operation does not depend on issuance or completion of a previous operation; rather, retirement of an operation involves successful processing of the operation by the retire controller. For example, in the case a read operation from an I/O device, data is retrieved from the I/O cache and provided to the requesting I/O device. For a write operation, a value in the I/O cache is updated with the data provided by the I/O device, thus making the new value visible to the multiprocessor system logic.

As a further example, an I/O device issues a first memory reference read operation to the IOP. If the prefetch controller determines that the data is not present in a cache entry in the cache, it issues a prefetch operation to the multiprocessor system for the data and loads the read operation into a retire queue. The issued operation is ordered by the ordering point of the system, a request for the data is forwarded to the owner, and data is returned from the owner to the IOP. A commit-signal is generated by the ordering point in response to the issued operation and returned to the IOP and stored in the corresponding cache entry. If the prefetch controller determines that the data is present in the cache, it loads the first read operation only into the retire queue. Meanwhile, if the I/O device issues a second read operation to the IOP, the operation is loaded into the retire queue.

When the first read operation propagates up to the head of the retire queue, the cache is checked again to determine if data is now present in the cache. If not, the request waits at the head of the retire queue until data is received by the IOP cache. The retire controller processes or retires the request by delivering the data to the I/O device. Notably, the retire controller does not "pop" the first read request from the head of the retire queue until the corresponding commit-signal is returned to the IOP and the cache entry is updated to reflect the return of the commit-signal. The commit-signal may arrive at the IOP before or after the data.

Thus, even though the first read operation has been performed, the retire controller does not process the second read operation until the commit-signal for the first read operation has been received. That is, once the commit-signal is returned and the cache entry is updated, the retire controller pops the first read operation from the retire queue and processes the second read operation. This aspect of the invention ensures that the IOP provides the appearance of sequentially consistent behavior to the I/O device.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF THE ILLUSTRATIVE EMBODIMENTS

As described herein, an IOP may be incorporated into a number of multiprocessing systems. For example, the IOP may be incorporated within a symmetric multiprocessing (SMP) node having a plurality of processors, IOPs and a shared memory interconnected by a local switch. Further, the IOP may be incorporated in a SMP system having a number of SMP nodes interconnected via a hierarchical switch. Each SMP node thus functions as a building block in the SMP system. Below, the structure and operation of an SMP node embodiment that may be advantageously used with the present invention is first described, followed by a description of the SMP system embodiment. Finally, the structure and operation of the IOP is described.

Figure 1:
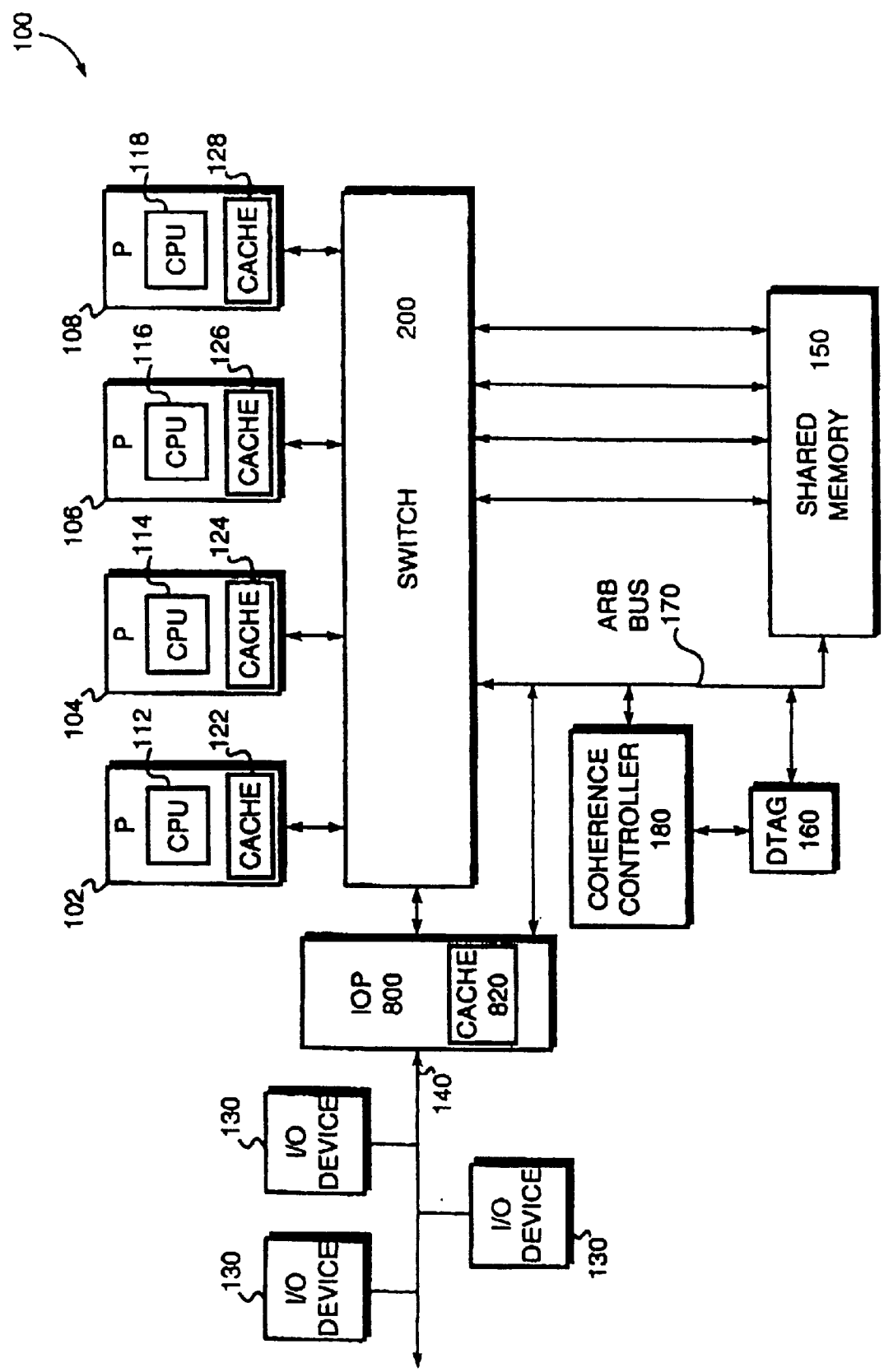
FIG. 1 is a schematic block diagram of a first multiprocessor node embodiment comprising a plurality of processors coupled to an input/output processor and a memory by a local switch.

SMP Node:

FIG. 1 is a schematic block diagram of a first multiprocessing system embodiment, such as a small SMP node 100, comprising a plurality of processors (P) 102–108 coupled to an input/output (I/O) processor 800 and a memory 150 by a local switch 200. The memory 150 is preferably organized as a single address space that is shared by the processors and apportioned into a number of blocks, each of which may include, e.g., 64 bytes of data. The I/O processor, or IOP 800, controls the transfer of data between external devices (not shown) and the system via an I/O bus 140. Data is transferred between the components of the SMP node in the form of packets. As used herein, the term "system" refers to all components of the SMP node excluding the processors and IOP. In an embodiment of the invention, the I/O bus may operate according to the conventional Peripheral Computer Interconnect (PCI) protocol.

Each processor is a modern processor comprising a central processing unit (CPU), denoted 112–118, that preferably incorporates a traditional reduced instruction set computer (RISC) load/store architecture. In the illustrative embodiment described herein, the CPUs are Alpha® 21264 processor chips manufactured by Digital Equipment Corporation®, although other types of processor chips may be advantageously used. The load/store instructions executed by the processors are issued to the system as memory reference, e.g., read and write, operations. Each operation may comprise a series of commands (or command packets) that are exchanged between the processors and the system. As described further herein, characteristics of modern processors include the ability to issue memory reference operations out-of-order, to have more than one memory reference outstanding at a time and to accommodate completion of the memory reference operations in arbitrary order.

In addition, each processor and IOP employs a private cache (denoted 122–128 and 820, respectively) for storing data determined likely to be accessed in the future. The caches are preferably organized as write-back caches apportioned into, e.g., 64-byte cache lines accessible by the processors; it should be noted, however, that other cache organizations, such as write-through caches, may be used in connection with the principles of the invention. It should be further noted that memory reference operations issued by the processors are preferably directed to a 64-byte cache line granularity. Since the IOP 800 and processors 102–108 may update data in their private caches without updating shared memory 150, a cache coherence protocol is utilized to maintain consistency among the caches.

The cache coherence protocol of the illustrative embodiment is preferably a conventional write-invalidate, ownership-based protocol. "Write-Invalidate" implies that when a processor modifies a cache line, it invalidates stale copies in other processors' caches rather than updating them with the new value. The protocol is termed an "ownership protocol" because there is always an identifiable owner for a cache line, whether it is shared memory, one of the processors or the IOP entities of the system. The owner of the cache line is responsible for supplying the up-to-date value of the cache line when requested. A processor/IOP may own a cache line in one of two states: "exclusively" or "shared". If a processor has exclusive ownership of a cache line, it may update it without informing the system. Otherwise, it must inform the system and potentially invalidate copies in the other caches.

A shared data structure 160 is provided for capturing and maintaining status information corresponding to the states of data used by the system. In the illustrative embodiment, the shared data structure is configured as a conventional duplicate tag store (DTAG) 160 that cooperates with the individual caches of the system to define the coherence protocol states of the data in the system. The protocol states of the DTAG 160 are administered by a coherence controller 180, which may be implemented as a plurality of hardware registers and combinational logic configured to produce a sequential logic circuit, such as a state machine. It should be noted, however, that other configurations of the controller and shared data structure may be advantageously used herein.

The DTAG 160, coherence controller 180, IOP 800 and shared memory 150 are interconnected by a logical bus referred to an Arb bus 170. Memory reference operations issued by the processors are routed via the local switch 200 to the Arb bus 170. The order in which the actual memory reference commands appear on the Arb bus is the order in which processors perceive the results of those commands. In accordance with this embodiment of the invention, though, the Arb bus 170 and the coherence controller 180 cooperate to provide an ordering point, as described herein.

The commands described herein are defined by the Alpha® memory system interface and may be classified into three types: requests, probes, and responses. Requests are commands that are issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache.

Probes are commands issued by the system to one or more processors requesting data and/or cache tag status updates. Probes include Forwarded Read (Frd) commands, Forwarded Read Modify (FRdMod) commands and Invalidate (Inval) commands. When a processor P issues a request to the system, the system may issue one or more probes (via probe packets) to other processors. For example if P requests a copy of a cache line (a Rd request), the system sends a probe to the owner processor (if any). If P requests exclusive ownership of a cache line (a CTD request), the system sends Inval probes to one or more processors having copies of the cache line. If P requests both a copy of the cache line as well as exclusive ownership of the cache line (a RdMod request) the system sends a FRd probe to a processor currently storing a dirty copy of a cache line of data. In response to the Frd probe, the dirty copy of the cache line is returned to the system. A FRdMod probe is also issued by the system to a processor storing a dirty copy of a cache line. In response to the FRdMod probe, the dirty cache line is returned to the system and the dirty copy stored in the cache is invalidated. An Inval probe may be issued by the system to a processor storing a copy of the cache line in its cache when the cache line is to be updated by another processor.

Responses are commands from the system to processors/IOPs which carry the data requested by the processor or an acknowledgment corresponding to a request. For Rd and RdMod requests, the response is a Fill and FillMod response, respectively, each of which carries the requested data. For a CTD request, the response is a CTD-Success (Ack) or CTD-Failure (Nack) response, indicating success or failure of the CTD, whereas for a Victim request, the response is a Victim-Release response.

Figure 2:
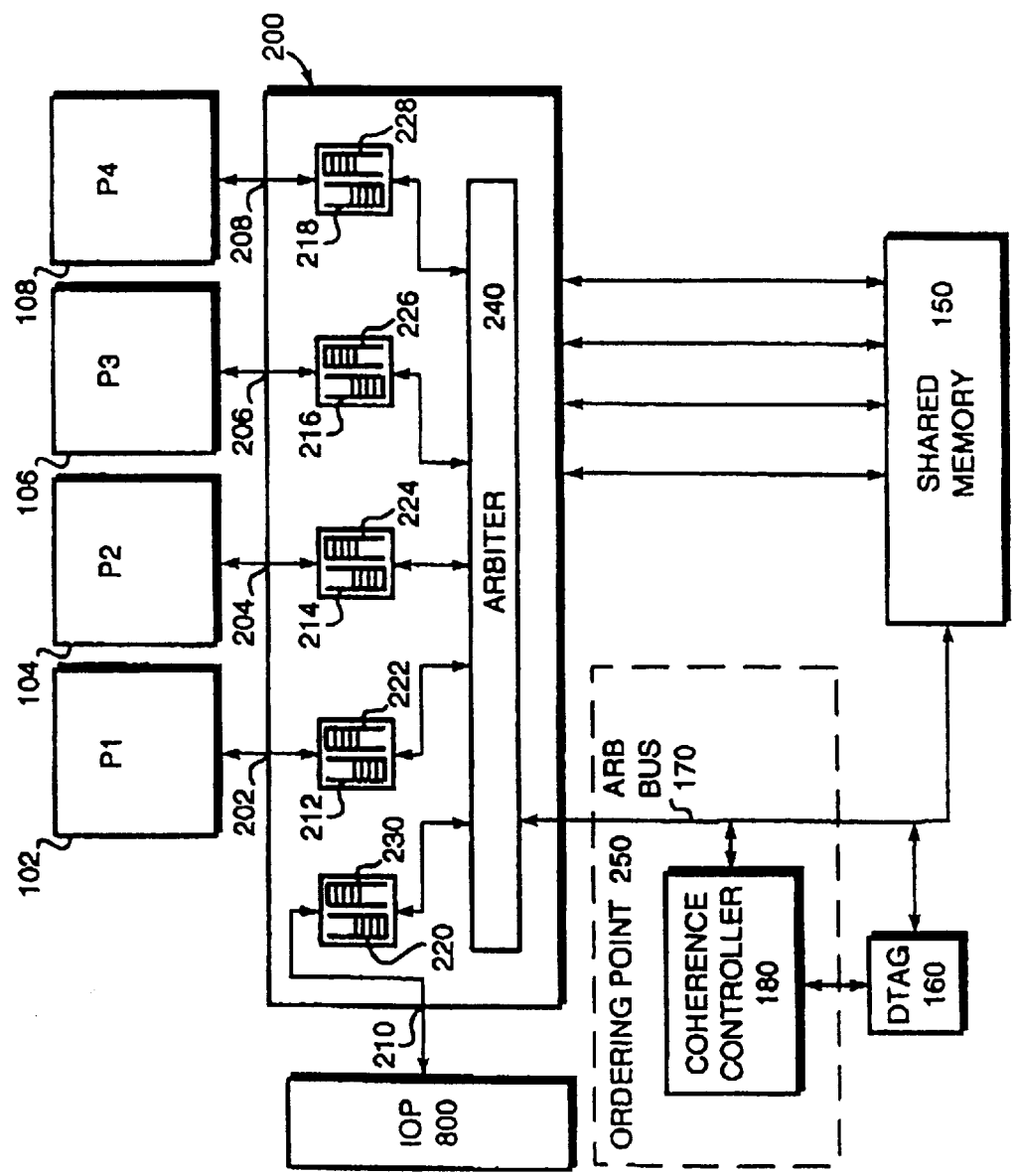
FIG. 2 is a schematic block diagram of the local switch comprising a plurality of ports coupled to the respective processors of FIG. 1.

FIG. 2 is a schematic block diagram of the local switch 200 comprising a plurality of ports 202–210, each of which is coupled to a respective processor (P1–P4) 102–108 and IOP 800 via a full-duplex, bi-directional clock forwarded data link. Each port includes a respective input queue 212–220 for receiving, e.g., a memory reference request issued by its processor and a respective output queue 222–230 for receiving, e.g., a memory reference probe issued by system control logic associated with the switch. An arbiter 240 arbitrates among the input queues to grant access to the Arb bus 170 where the requests are ordered into a memory reference request stream. In the illustrative embodiment, the arbiter selects the requests stored in the input queues for access to the bus in accordance with an arbitration policy, such as a conventional round-robin algorithm.

The following example illustrates the typical operation of multiprocessing system including switch 200. A Rd request for data item x is received at the switch 200 from P1 and loaded into input queue 212. The arbiter 240 selects the request in accordance with the arbitration algorithm. Upon gaining access to the Arb bus 170, the selected request is routed to the ordering point 250 wherein the states of the corresponding cache lines are interrogated in the DTAG 160. Specifically, the coherence controller 180 examines the DTAG to determine which entity of the system "owns" the cache line and which entities have copies of the line. If processor P3 is the owner of the cache line x and P4 has a copy, the coherence controller generates the necessary probes (e.g., a Fill x and Inval x) and forwards them to the output queues 226 and 228 for transmission to the processors.

Because of operational latencies through the switch and data paths of the system, memory reference requests issued by P1 may complete out-of-order. In some cases, out-of-order completion may affect the consistency of data in the system, particularly for updates to a cache line. Memory consistency models provide formal specifications of how such updates become visible to the entities of the multiprocessor system. In the illustrative embodiment of the present invention, a sequential consistency model is described, although it will be apparent to those skilled in the art that other consistency models, such as weak ordering, may be used.

In a sequentially consistent system, inter-reference ordering is typically imposed by generally requiring completion of each memory reference operation before issuance of the next operation. For example, the following program instructions are executed by P1 and P2:

| P1 | P2 |
|---|---|
| St x | Ld flag, 0 |
| St y | Rd x |
| St z | Rd y |
| St flag, 0 | Rd z |

In the case of P1's program, each store instruction (via a write operation) for data items x, y and z and for the flag must be completed in sequence. At P2, a load (via a read operation) flag is performed to test for the value 0. Subsequently, the data items x, y and z are requested. The sequential consistency model requires that if P2 gets the value 0 for flag, then it must get the updated values of data items x, y, and z.

Figure 3:
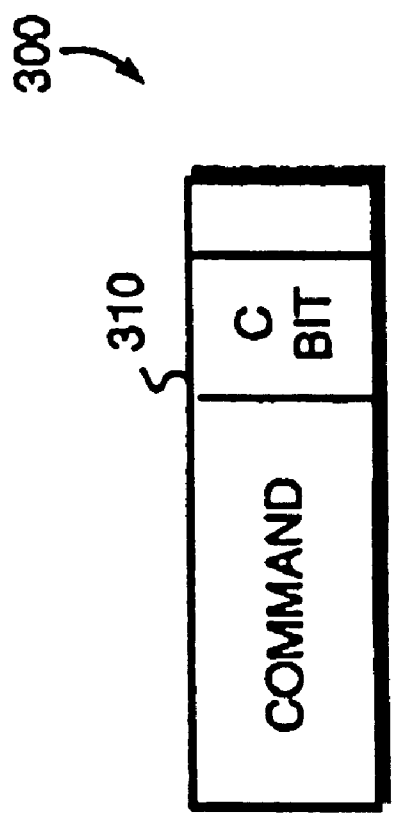
FIG. 3 is a schematic diagram of an embodiment of a commit-signal implemented as a commit-signal packet.

Since each memory reference operation may consist of a number of commands, the latency of inter-reference ordering is a function of the extent to which each command must complete before the reference is considered ordered. A mechanism is provided for reducing the latency of inter-reference ordering between sets of memory reference operations in a multiprocessor system having a shared memory. The mechanism generally comprises a commit signal that is generated by the ordering point 250 of the multiprocessor system in response to a memory reference operation issued by a requesting processor for particular data. FIG. 3 is a schematic diagram of a commit signal that is preferably implemented as a commit-signal packet structure 300 characterized by the assertion of a single, commit-signal ("C") bit 310 to processor. It will be apparent to those skilled in the art that the commit signal may be manifested in a variety of forms, including a discrete signal on a wire, and in another embodiment, a packet identifying the operation corresponding to the commit signal. The commit-signal facilitates inter-reference ordering by indicating the apparent completion of the memory reference operation to those entities of the system. Specifically, for sequentially consistent behavior, a processor or IOP must receive the commit signal for a first memory reference operation before it retires a second memory reference operation.

Referring again to the above example including the program instructions executed by P1, generation of a commit-signal by the ordering point 250 in response to each RdMod request for data items x, y and z (corresponding to each store instruction for those data items) issued by P1 occurs upon successful arbitration and access to the Arb bus 170, and total ordering of those requests with respect to all memory reference requests appearing on the bus. Total ordering of each memory reference request constitutes a commit-event for the requested operation. According to the invention, the commit-signal 300 is preferably transmitted to P1 upon the occurrence of, or after, the commit-event.

The ordering point 250 determines the state of the data items throughout the system and generates probes (i.e., probe packets) to invalidate copies of the data and to request forwarding of the data from the owner to the requesting processor P1. For example, the ordering point may generate FRdMod probe to P3 (i.e., the owner) and Inval probes to P2 and P4. The ordering point also generates the commit-signal at this time for transmission to the P1. The commit-signal and probe packets are loaded into the output queues and forwarded to the respective processors in single, first-in, first-out (FIFO) order; in the case of P1, the commit-signal is loaded into queue 222 and forwarded to P1 along with any other probes pending in the queue. As an optimization, the commit-signal 300 may be "piggy backed" on top of one of these probe packets; in the illustrative embodiment of such an optimization, the C-bit of a probe packet may be asserted to indicate that a commit-signal is being sent.

Figure 4:
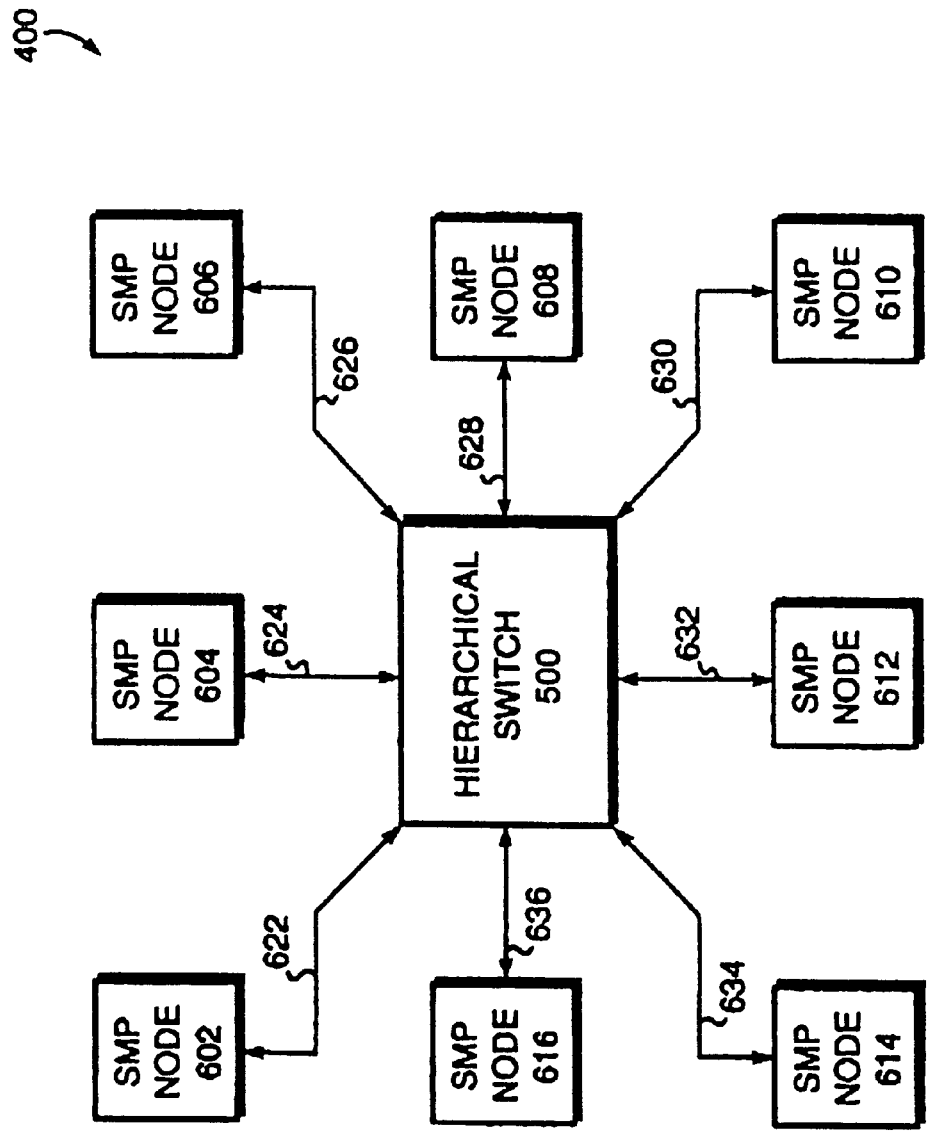
FIG. 4 is a schematic block diagram of a second multi-processing system embodiment comprising a plurality of multiprocessor nodes interconnected by a hierarchical switch.

SMP System:

FIG. 4 is a schematic block diagram of a second multi-processing system embodiment, such as a large SMP system 400, comprising a plurality of SMP nodes 602–616 interconnected by a hierarchical switch 500. Each of the nodes is coupled to the hierarchical switch by a respective full-duplex, bi-directional, clock forwarded hierarchical switch (HS) link 622–636. Data is transferred between the nodes in the form of packets. In order to couple to the hierarchical switch, each SMP node is augmented to include a global port interface. Also, in order to provide a shared memory environment, each node is configured with an address space and a directory for that address space. The address space is generally partitioned into memory space and IO space. The processors and IOP of each node utilize private caches to store data strictly for memory-space addresses; 10 space data is not cached in private caches. Thus, the cache coherency protocol employed in system 400 is concerned solely with memory space commands.

As used herein with the large SMP system embodiment, all commands originate from either a processor or an IOP, where the issuing processor or IOP is referred to as the "source processor." The address contained in a request command is referred to as the "requested address." The "home node" of the address is the node whose address space maps to the requested address. The request is termed "local" if the source processor is on the home node of the requested address; otherwise, the request is termed a "global" request. The Arb bus at the home node is termed the "home Arb bus". The "home directory" is the directory corresponding to the requested address. The home directory and memory are thus coupled to the home Arb bus for the requested address.

A memory reference operation (request) emanating from a processor or IOP is first routed to the home Arb bus. The request is routed via the local switch if the request is local; otherwise, it is considered a global request and is routed over the hierarchical switch. In this latter case, the request traverses the local switch and the GP link to the global port, passes over the HS link to the hierarchical switch, and is then forwarded over the GP link and local switch of the home node to the home Arb bus.

Figure 5:
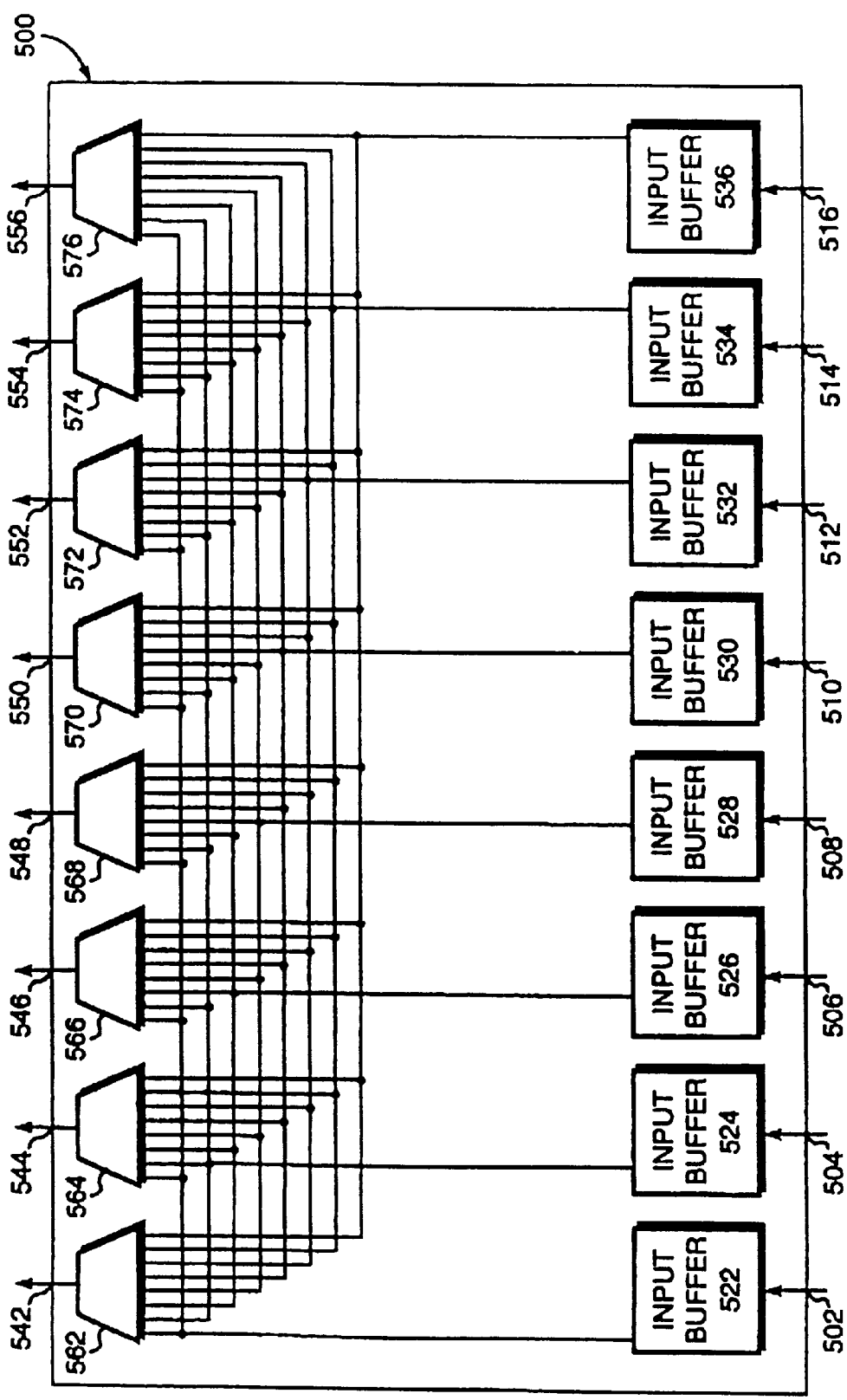
FIG. 5 is a schematic block diagram of the hierarchical switch of FIG. 4.

FIG. 5 is a schematic block diagram of the hierarchical switch 500 comprising a plurality of input ports 502–516 and a plurality of output ports 542–556. The input ports 502–516 receive command packets from the global ports of the nodes coupled to the switch, while the output ports 542–556 forward packets to those global ports. In the illustrative embodiment of the hierarchical switch 500, associated with each input port is an input (queue) buffer 522–536 for temporarily storing the received commands. Although the drawing illustrates one buffer for each input port, buffers may be alternatively shared among any number of input ports. An example of a hierarchical switch (including the logic associated with the ports) that is suitable for use in the illustrative embodiment of the invention is described in copending and commonly-assigned U.S. patent application Ser. No. 08/957,298, filed Oct. 24, 1997 and titled, Order Supporting Mechanism For Use In A Switch-Based Multi-Processor System, now abandoned which application is hereby incorporated by reference as though fully set forth herein.

In the large SMP system, the ordering point is associated with the hierarchical switch 500. According to the present invention, the hierarchical switch 500 is configured to support novel ordering properties in order that commit signals may be gainfully employed. The ordering properties are imposed by generally controlling the order of command packets passing through the switch. For example, command packets from any of the input buffers 522–536 may be forwarded in various specified orders to any of the output ports 542–556 via multiplexer circuits 562–576.

The ordering properties apply to commands that contain probe components (Invals, FRds, and FrdMods). These commands are referred to as probe-type commands. One ordering property of the hierarchical switch is that it imposes an order on incoming probe-type commands. That is, it enqueues them into a logical FIFO queue based on time of arrival. For packets that arrive concurrently (in the same clock), it picks an arbitrary order and places them in the FIFO queue. A second ordering property of the switch is its ability to "atomically" multicast all probe-type packets. All probe-type packets are multicast to target nodes as well as to the home node and the source node. In this context, "atomic multicast" means that for any pair of probe-type commands A and B, either all components of A appear before all components of B or vice versa. Together, these two properties result in a total ordering of all probe-type packets. The total ordering is accomplished using the input buffers in conjunction with control logic and multiplexers. An example of a hierarchical switch with these ordering properties that is suitable for use in the illustrative embodiment of the invention is described in copending and commonly-assigned U.S. patent application Ser. No. 08/957,097 titled, Method and Apparatus for Reducing Latency of Inter-Reference Ordering in a Multiprocessor System, which application is hereby incorporated by reference as though fully set forth herein.

Figure 6:
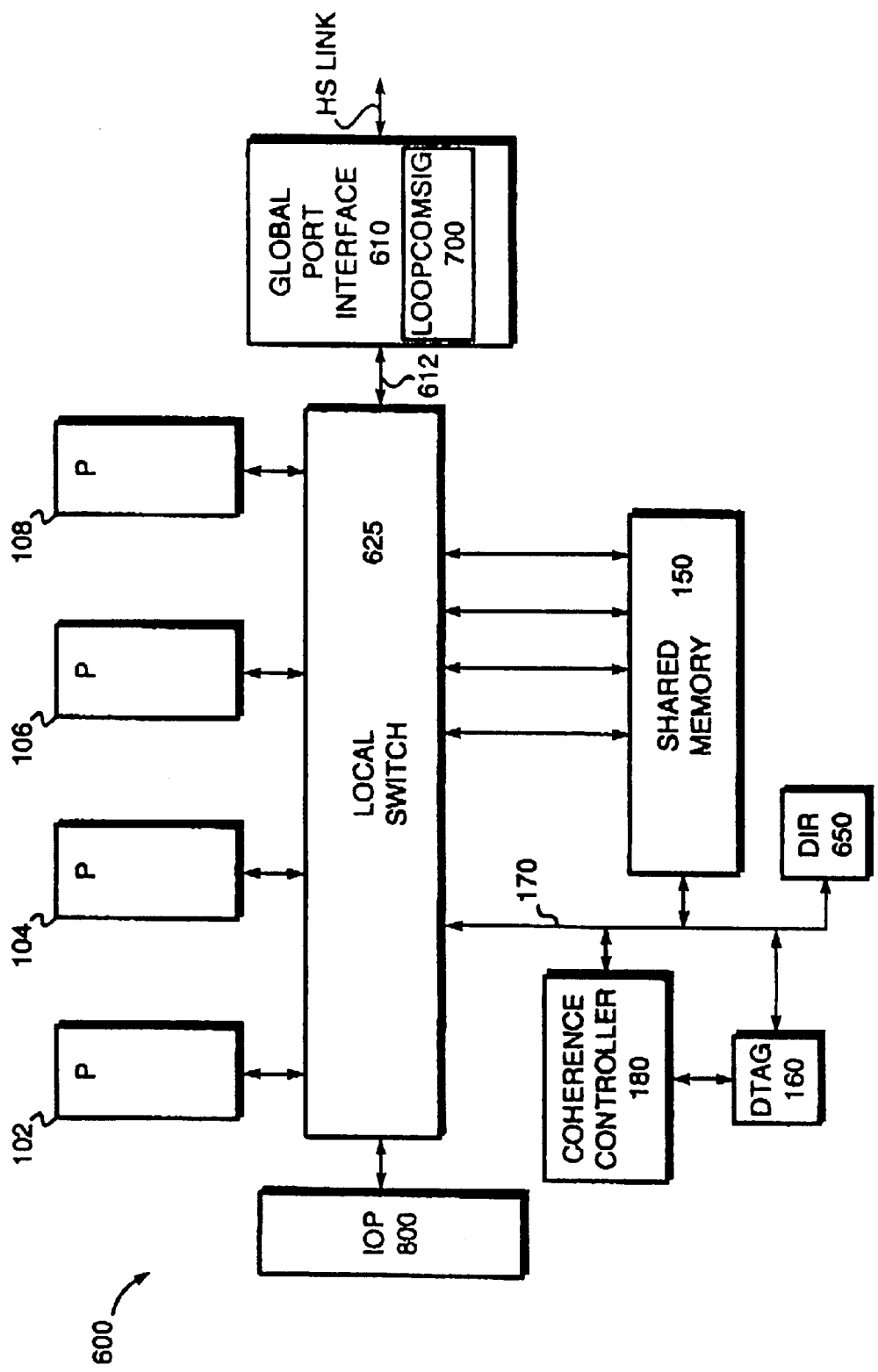
FIG. 6 is a schematic block diagram of an augmented multiprocessor node comprising a plurality of processors interconnected with a shared memory, an IOP and a global port interface via a local switch.

FIG. 6 is a schematic block diagram of an augmented SMP node 600 comprising a plurality of processors (P) 102–108 interconnected with a shared memory 150, an IOP 800 and a global port interface 610 via a local switch 625. The processor, shared memory and IOP entities are similar to the those entities of FIG. 1. The local switch 625 is augmented (with respect to switch 200) to include an additional port coupling the interface 610 by way of a full-duplex, clock forwarded global port (GP) data link 612. In addition to the DTAG 160, an additional shared data structure, or directory (DIR) 650, is coupled to Arb bus 170 to administer the distributed shared memory environment of the large system 400.

The global port interface 610 includes a loop commit-signal (LoopComSig) table 700 for monitoring outstanding probe-type commands from the SMP node. All probe-type commands are multicast by the hierarchical switch to all target nodes as well as to the home node and the source node. The component sent to the source node serves as the commit signal whereas the one to the home node (when the home node is not the source node) serves as the probe-delivery-acknowledgment (probe-ack). In the illustrative embodiment, the LoopComSig table 700 is implemented as a content addressable memory device, although other configurations and structures of the table may be used. Each time a probe-type command is sent to the global port, an entry is created in the LoopComSig table; when a corresponding probe-ack returns to the node's Arb bus, the entry is cleared.

Thus, the LoopComSig table is used to determine if a probe-type command corresponding to a particular address x is outstanding from the node at any specific time. This information is used to optimize the generation of comsigs for local commands as follows: In the case of a local command appearing on the home Arb bus, if the coherence controller determines that no probe-type commands need to be sent to other nodes and if there are no outstanding probe-type commands as indicated by the LoopComSig table, then the commit-signal is sent directly to the source processor. In the embodiment that does not include the LoopComSig table, commit signals for local commands always originate at the hierarchical switch. Using the LoopComSig table, the coherence controller is able to generate commit signals locally and hence reduce the latency of commit signals for a substantial fraction of local commands.

Note that although the table 700 is physically located on the global port interface 610, it may be logically resident on the Arb bus 170 along with the other shared data structures. The DIR, DTAG and LoopComSig table cooperate to maintain coherency of cache lines in the SMP system. That is, the DTAG captures all of the state required by the small SMP node cache coherence protocol while the DIR captures the coarse state for the large SMP system protocol; the LoopComSig table captures state information at a finer level. Each of these components interfaces with the global port interface 610 to provide coherent communication between the SMP nodes coupled to the hierarchical switch.

Thus when a request R arrives at the home Arb bus, the DIR, DTAG and LoopComSig states are examined in order to generate probe commands to other processors and/or response commands to the source processor. Further, the states of the DIR, DTAG and LoopComSig are atomically updated to reflect the serialization of the request R. The home Arb bus is defined as the serialization point for all requests to a memory address. For each memory address x, store instructions appear to have been executed in the order in which their corresponding requests (RdMods or CTDs) arrive at the home Arb bus. Load instructions to address x will receive the version of x corresponding to the store x most recently serialized at the home Arb.

Figure 7:
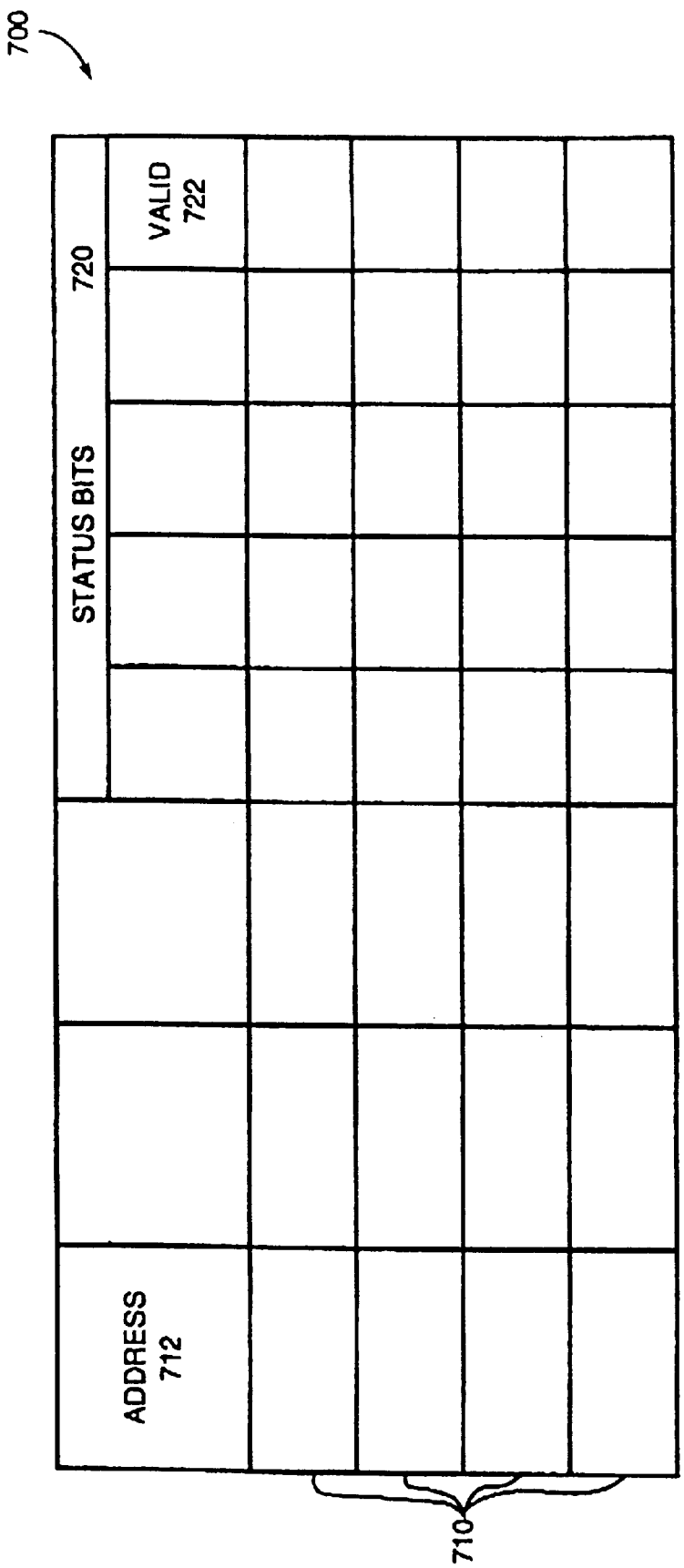
FIG. 7 illustrates an embodiment of a LoopComSig table.

FIG. 7 illustrates an embodiment of the LoopComSig table 700 containing a plurality of entries 710, each of which includes an address field 712 and a number of status bits 720. The address field 712 stores the address of the cache line for a probe-type command that is currently outstanding. The status bits 720 reflect the status of the outstanding command; alternatively, the status bits may be used to reflect various properties of the outstanding operation. For example, the valid bit 722 indicates whether the allocated entry is valid, thus denoting that this is a probe-type command with outstanding probe-acks. Note that not all of the status bits that may be included in the LoopComSig table 700 have been shown. Rather, those status bits that have relevance to the description herein have been shown. In addition, it is envisioned that other status bits may be alternatively provided as deemed necessary to maintain memory coherency, and thus the present invention should not be limited to any particular assignment of bits in the LoopComSig table.

Referring again to FIGS. 4 and 6, the shared memory address space is preferably distributed among the nodes and directories associated with those nodes. That is, the memory and directory of node 602 may contain addresses 1–1000, the memory and directory for node 604 may contain addresses 1001–2000, the memory and directory for node 606 may contain addresses 2001–3000 and the memory and directory for node 608 may contain addresses 3001–4000, etc. However, each processor in each node may issues commands to access data in any portion of the shared memory system. That is, the commands may be handled entirely within the node of the issuing processor (i.e., the source node) or may be transmitted to other nodes in the system based on the address and type of command.

Each processor of the system 400 may access portions of shared memory stored at its home node, or at any other SMP node. When a processor accesses (reads or writes) a shared memory cache line for which the home node is the processor's own node, the memory reference is referred to as a "local" memory reference. When the reference is to a cache line for which the home node is a node other than the processor's node, the reference is referred to as a remote or "global" memory reference. Because the latency of a local memory access differs from that of a remote memory access, the SMP system 400 is said to have a non-uniform memory access (NUMA) architecture. Further, since the system provides coherent caches, the system is often called a cache-coherent NUMA (CC-NUMA) system. In the illustrative embodiment of the invention, the large SMP system 400 is preferably referred to as a distributed shared memory system, although it may also be considered equivalent to the above classes of systems. Also the processor consistency model described herein for the large SMP system is preferably sequential consistency, although other processor consistency models such as weak ordering or release consistency may be used.

IOP:

An I/O device, such as I/O device 130, typically also expects sequentially consistent behavior with respect to the memory reference operations it issues to the shared memory 150 through the IOP. That is, the I/O device expects each read and write operation to appear as if it is issued and completed in sequentially consistent I-stream order by the IOP. A typical approach to ensuring sequential consistency is for the IOP to "complete" each previous operation from I/O device 130 before issuing a subsequent operation from that device. Such an arrangement is inefficient and, in the context of inter-reference ordering, adversely affects latency. The present invention relates to a high-performance IOP for maintaining inter-reference ordering among memory reference operations issued by an I/O device of a multiprocessor system to a shared memory.

Figure 8:
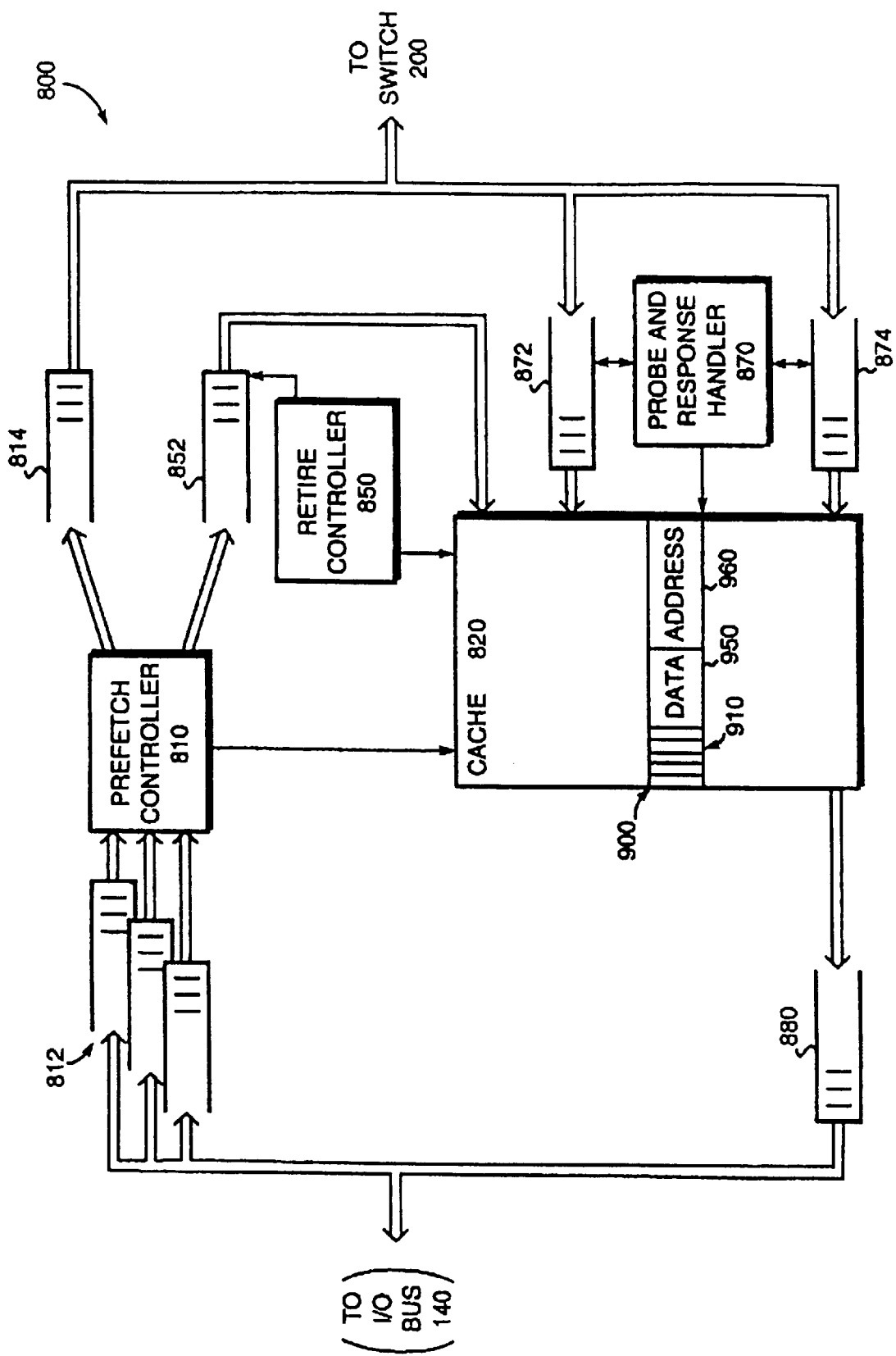
FIG. 8 is a schematic diagram of a high-performance input/output processor (IOP) including an I/O cache in accordance with the present invention.

FIG. 8 is a schematic diagram of the high-performance IOP 800 comprising a prefetch controller 810 coupled to an I/O cache 820 for prefetching data into cache without any ordering constraints (or out-of-order) and a retire controller 850 configured to retire operations in an order dependent upon the consistency model using commit-signals. In the illustrative embodiment, the cache 820 is preferably organized as a fully-associative, write-back cache having a plurality of entries 900, each of which includes a field 910 of state bits, a data field 950 and a tag or address field 960. As described herein, the state bits of field 910 relate to the coherency state of the cache line reflected by the cache entry. The data field 950 contains the data for the cache line and, since the cache is fully-associative, the field 960 contains the actual address of the data rather than a tag; if the cache was less than fully-associative, then the tag would be loaded into field 960.

The IOP further comprises a plurality of input request queues 812, each of which interfaces to the I/O bus 140 to receive memory reference operations issued by an I/O device 130 and loaded into a tail of the queue. To maintain order of the issued memory references, all operations from a particular I/O device are preferably loaded into a particular one of the input request queues. A head of each input request queue 812 is coupled to the prefetch controller 810. As described herein, the prefetch controller examines the address of each memory reference operation at a queue head and compares it with addresses stored in the cache entries 900. The controller 810 is also coupled to an output request queue 814 and a retire queue 852. Operations pending in the output request queue 814 are eventually sent to the system over the switch 200.

Based on the results of the comparison operation, the prefetch controller 810 either enqueues (loads) a prefetch request into the output request queue 814 while loading the operation into the retire queue 852 or it loads the memory reference operation solely into the retire queue 852. The decision is based on whether the data pertaining to the operation is stored in the cache or if it has already been prefetched; if it is, indicating the prefetching is not required, the controller 810 loads the operation into the retire queue 852 without issuing a prefetch request to queue 814. If the prefetch controller discovers that the data for the operation must be prefetched, it copies the operation into the retire queue and loads a prefetch request (i.e., a Rd or RdMod request) into the output request queue.

Operations loaded into the retire queue 852 are administered in order by the retire controller 850 as defined by certain constraints described herein. According to the invention, the ordered retirement functions of the IOP are specifically separated from its prefetching operations to allow prefetching by the prefetch controller 810 in an arbitrary manner; this feature improves overall performance of the system primarily because it allows for a large number of prefetch operations to be outstanding at a time. Responses from the system are returned to an input response queue 872 and are applied to the cache 820. Likewise, probes from the system are loaded into a probe queue 874 and are applied to the cache. A probe and response handler 870 accesses the cache entries 900 to apply the information provided by the responses and probes. An output response queue 880 returns read data responses to the I/O devices 130 via the I/O bus 140. It should be noted that the retire controller 850, the prefetch controller 810 and the probe and response handler 870 may each be implemented as a plurality of hardware registers and combinational logic configured to produce a sequential logic circuit, such as a state machine. It should be noted, however, that other configurations of the controllers and handler may be advantageously used herein.

Figure 9:
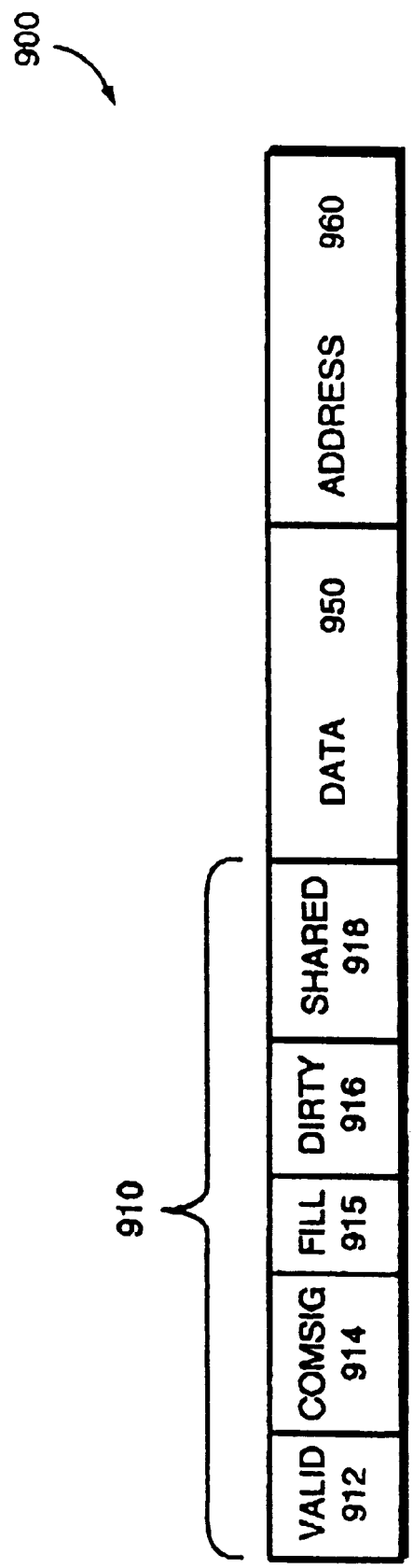
FIG. 9 is a schematic diagram of a cache entry of the I/O cache of FIG. 3.

FIG. 9 is a schematic diagram of a cache entry 900. As noted, each entry 900 comprises a data field 950, an address field 960 and a plurality of state bits in field 910. The state bits, in turn, comprise a valid bit 912, a commit-signal (ComSig) bit 914, a fill bit 915, a dirty bit 916 and a shared bit 918. The valid bit 912 indicates whether a cache entry has been allocated for a cache line address. If the prefetch controller 810 determines that there is not an entry for an operation, such as a read request, it allocates one by (i) locating a free cache line/block, (ii) marking the entry valid by asserting the valid bit 912 and (iii) loading in the address of the request. The controller then issues the read request to both the output request queue 814 and the retire queue 852.

The dirty bit 916 indicates, when asserted, that the state of the cache line is dirty and an asserted shared bit 918 indicates that the state of the cache line is dirty and shared. The ComSig bit 914 is asserted when a commit-signal for the operation that allocated the cache line entry has been received; in this case, the allocating operation may be a read or RdMod operation. An asserted fill bit 915 indicates that the data for the cache line is present in the cache 820. For example, if an entry has been previously allocated and a prefetch request has been issued to the system to prefetch the data for that entry, a fill (data) response and a commit-signal probe are thereafter returned to the IOP. When the fill data response is returned through the input response queue 872, the probe and response handler 870 asserts the fill bit 915 for the appropriate cache entry. When the commit-signal returns through the probe queue 874, the handler 870 likewise asserts the ComSig bit 914 for the cache entry.

For example, an I/O device 130 issues a first memory reference read operation to the IOP 800 for data x. If the prefetch controller determines that the data is not present in a cache entry 900 in the cache 820, it issues a prefetch operation to the multiprocessor system for the data and loads the read operation into the retire queue 852. The issued operation is ordered by the ordering point of the system, a request for the data is forwarded to the owner, and data is returned from the owner to the IOP. A commit-signal is generated by the ordering point in response to the issued operation and returned to the IOP and store in the corresponding cache entry 900. If the prefetch controller 810 determines that the data is present in the cache, it loads the first read operation only into the retire queue. Meanwhile, if the I/O device issues a second read operation to the IOP, the operation is loaded into the retire queue 852, as above.

When the first read operation propagates up to the head of the retire queue, the cache 820 is checked again to determine if data is now present in the cache. If not, the request waits at the head of the retire queue until data is received by the IOP cache. The retire controller 850 processes or retires the request by delivering the data to the I/O device. Notably, the retire controller does not "pop" the first read request from the head of the retire queue 852 until the corresponding commit-signal is returned to the IOP and the cache entry is updated to reflect the return of the commit-signal. The commit-signal may arrive at the IOP before or after the data.

Thus, even though the first read operation has been performed, the retire controller 850 does not process the second read operation until the commit-signal for the first read operation has been received. That is, once the commit-signal is returned and the cache entry is updated, the retire controller pops the first read operation from the retire queue and processes the second read operation. This aspect of the invention ensures that the IOP provides the appearance of sequentially consistent behavior to the I/O device.

While there has been shown and described an illustrative embodiment for reducing the latency of inter-reference ordering between sets of memory reference operations in a multiprocessor system having a shared memory configured wherein processors and IOPs issue and complete those operations out-of-order, it is to be understood that various other adaptations and modifications may be made within the spirit and scope of the invention. For example in an alternate embodiment, inter-reference ordering may be imposed by an I/O memory barrier (MB) operation inserted between memory reference operations issued by an I/O device. Orderly issuance of the memory reference operations by the device may cause out-of-order completion of the operations due to operational latencies throughout the system. To ensure correct implementation of the consistency model, in the prior art, issuance of post-I/OMB operations is inhibited until completion of all pre-I/OMB operations has been confirmed to the IOP.

Figure 10:
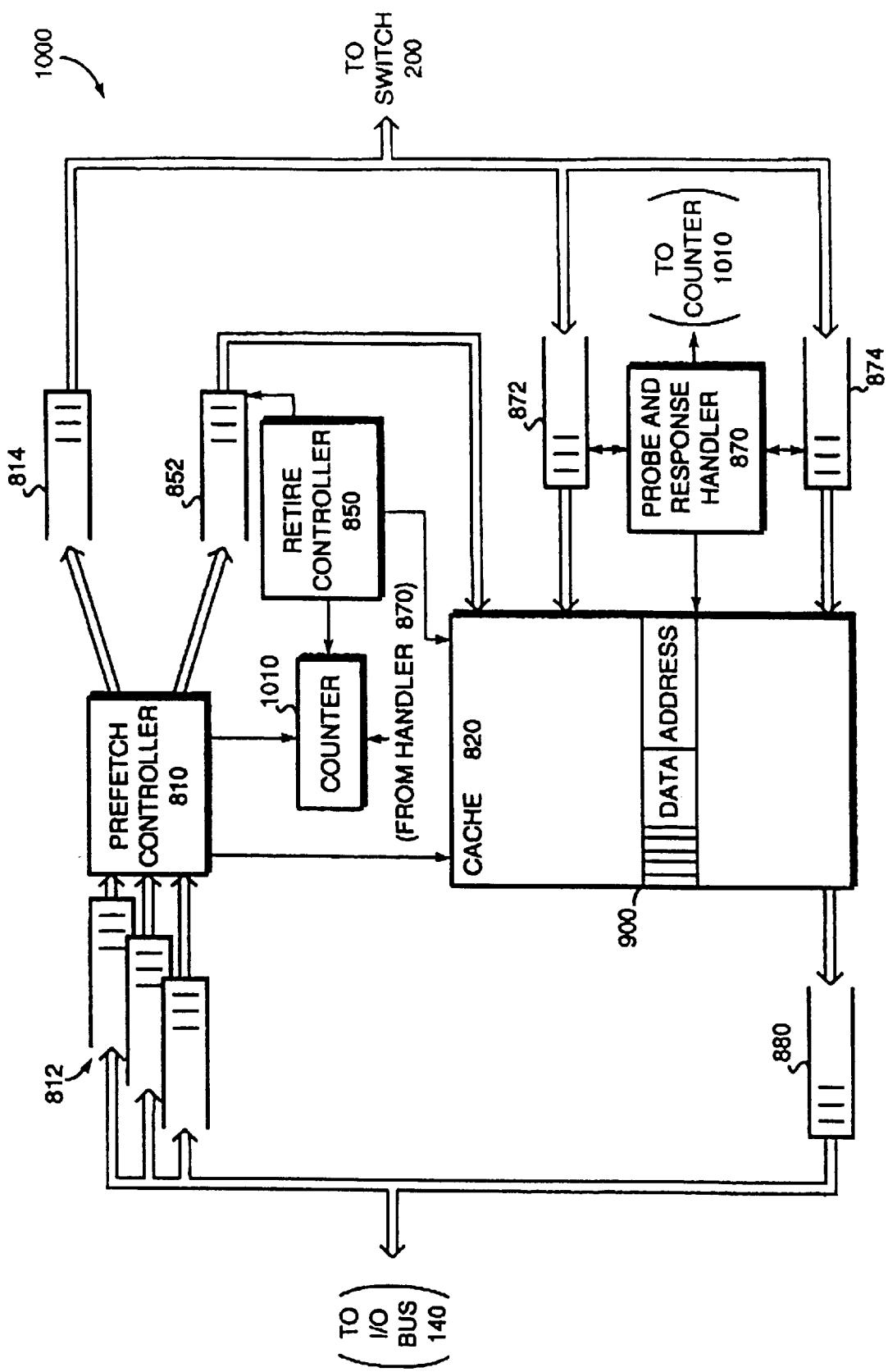
FIG. 10 is a schematic diagram of an alternate embodiment of a high-performance IOP in accordance with the present invention.

According to the present invention, however, post-I/OMB operations may be issued once they are retired and corresponding commit signals of the pre-I/OMB operations have been received by the retire controller. Since commit signals are generally received sooner than the completion of memory reference operations, the performance of the system is improved. FIG. 10 is a schematic diagram of an alternate embodiment of a high-performance IOP 1000 configured to operate with a weak-ordering consistency model to the shared memory. Specifically, the IOP 1000 has been modified to include a counter 1010; here, the retire controller 850 need only count commit-signals that are received in response to pre-I/OMB operations and ensure that the counter 1010 realizes a value of zero before proceeding past the I/OMB. Note that in this embodiment, the retire controller only waits for commit-signals at the I/OMB operation; that is, all pre-I/OMB operations may be issued and retired in any order but upon reaching the I/OMB operation, the counter value must be zero.

Specifically, the prefetch controller 810 increments the counter 1010 upon loading an operation into the retire queue 852 and the probe and response handler 870 decrements the counter upon receipt of each commit-signal. The handler 870 also asserts the commit-signal bit in the cache entry. The retire controller 850 monitors the counter 1010 for value zero in order to proceed past the I/OMB operation. Thus, an I/0 device 130 issues an I/OMB operation over the I/O bus 140 to the IOP 1000 where it is loaded into the appropriate input request queue 812. When the I/OMB operation reaches the head of the input queue, the prefetch controller 810 loads it into the retire queue 852. All requests previously loaded into the retire queue are retired by the retire controller 850 and, upon reaching the head of the retire queue, the I/OMB operation instructs the retire controller to "poll" the counter 1010. The retire controller monitors the counter until it realizes a value of zero and, at that point, the retire controller 850 passes the I/OMB operation. The retire controller can then proceed processing the post-I/OMB operations.

In yet another embodiment of the invention, there may be one counter 1010 per I/O device. For this embodiment, the commit signal identifies the operation corresponding to the commit signal to identify which I/O device issued it, such as an I/O device ID.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An I/O processor (IOP) for delivering I/O performance while maintaining inter-reference ordering among memory reference operations issued by an I/O device to a shared memory multiprocessor system, the IOP comprising:

an I/O cache having a plurality of cache entries for storing data relating to the memory reference operations issued by the I/O device; and a retire controller coupled to the I/O cache and configured to one of (i) retrieve data from an entry of the cache and provide the retrieved data to the I/O device and (ii) update the entry with data provided by the I/O device, the retire controller imposing inter-reference ordering among the memory reference operations including operations issued to the system for data not present in the cache, the inter-reference ordering based on receipt of a commit signal for each operation issued to the system, the commit signal generated by an ordering point of the system and transmitted to the IOP in response to total ordering of each issued operation at the ordering point, wherein the commit signal for a memory reference operation indicates the apparent completion of the operation rather than actual completion of the operation.

2. The IOP of claim 1 further comprising a retire queue coupled to the retire controller for storing previous and subsequent memory reference operations issued by the I/O device.

3. The IOP of claim 2 further comprising a prefetch controller coupled to the I/O cache for prefetching data into the cache without any ordering constraints.

4. The IOP of claim 3 further comprising an input request queue for receiving the memory reference operations issued by the I/O device and providing the operations to the prefetch controller.

5. The IOP of claim 4 further comprising an output request queue for receiving the memory reference operations provided to the prefetch controller as prefetch operations and providing the prefetch operations to the system.

6. The IOP of claim 5 further comprising an input response queue coupled to the I/O cache for receiving data requested by the prefetch operations and providing the data to appropriate cache entries of the cache.

7. The IOP of claim 6 further comprising, wherein commitment of the previous operation is associated with receipt of a commit signal returned by the system to the IOP, a probe queue coupled to the I/O cache for receiving the commit signal and providing the signal to the appropriate cache entry of the cache.

8. The IOP of claim 7 further comprising a probe and response handler coupled to the I/O cache for accessing the appropriate cache entries to apply the data and commit signal provided by the input response and probe queues.

9. The IOP of claim 8 further comprising an output response queue coupled to the I/O cache for returning data to the I/O device.

10. The IOP of claim 1 wherein a programming interface to the distributed shared memory is sequential consistency.

11. The IOP of claim 8 wherein a programming interface is weak-ordering and wherein inter-reference ordering is imposed by an I/O memory barrier (MB) operation issued by the I/O device between sets of the memory reference operations stored in the retire queue, the sets of memory reference operations issued to the IOP as pre-I/OMB memory reference operations and post-I/OMB memory reference operations.

12. The IOP of claim 11 wherein ordering of each prefetch operation constitutes a commit-event for the operation and wherein the commit signal is transmitted to the IOP upon the occurrence of, or after, the commit-event.

13. The IOP of claim 12 wherein receipt of the transmitted commit signal by the IOP constitutes commitment of the prefetch operation and wherein the retire controller may pass the I/OMB operation in the retire queue once commitment of all pre-I/OMB memory reference operations have been received by the IOP.

14. The IOP of claim 13 further comprising a counter of the IOP coupled to the prefetch controller, the retire controller and the probe and response handler, the prefetch controller incrementing the counter upon loading the pre-I/OMB instruction into the retire queue, the probe and response handler decrementing the counter upon receipt of each commit signal responsive to the pre-I/OMB operations, and the retire controller monitoring the counter for value zero in order to proceed past the I/OMB operation.

15. A method for delivering input/output (I/O) performance while maintaining inter-reference ordering among memory reference operations issued by an I/O device to an I/O processor (IOP) for data in a shared memory multiprocessor system, the method comprising the steps of:

issuing a first memory reference operation from the I/O device to a prefetch controller of the IOP;

transferring the first memory reference operation to the system as a prefetch operation for data requested by the first memory reference operation in response to the requested data not being present in a cache of the IOP;

loading the first memory reference operation into a retire queue of the IOP;

issuing a second memory reference operation from the I/O device to the prefetch controller of the IOP and loading the second memory reference operation into the retire queue behind the first memory reference operation;

in response to the first memory reference operation propagating to a head of the retire queue, determining whether the requested data is present in the cache;

if the requested data is not present in the cache, keeping the first memory reference operation at the head of the queue until the requested data is provided to the cache;

if the requested data is present in the cache, delaying retirement of the second memory reference operation until a commit signal corresponding to the prefetch operation has been returned to the cache, the commit signal generated by an ordering point of the system and transmitted to the cache in response to total ordering of the prefetch operation at the ordering point, thereby maintaining inter-reference ordering among the operations issued by the I/O device.

16. The method of claim 15 wherein the step of transferring comprises the steps of:

forwarding the ordered prefetch operation to an owner of the requested data; and providing the requested data from the owner to the cache of the IOP.

17. The method of claim 16 wherein the step of transferring further comprises the steps of:

returning the corresponding commit signal to the IOP; and updating the cache to reflect return of the corresponding commit signal.

18. The method of claim 17 further comprising the step of retiring the first memory reference operation at a retire controller of the IOP when the requested data is present in the cache and the cache is updated to reflect return of the corresponding commit signal, wherein the step of retiring of the memory reference operation comprises the step of delivering the requested data to the I/O device.

* * * * *